United States Patent [19]

Bloom

[11] Patent Number: 5,726,615

[45] Date of Patent: Mar. 10, 1998

[54] INTEGRATED-MAGNETIC APPARATUS

[76] Inventor: Gordon E. Bloom, 115 Duran Dr., San Rafael, Calif. 94903

[21] Appl. No.: 217,477

[22] Filed: Mar. 24, 1994

[51] Int. Cl.$^6$ .............................. H01F 27/02; H01F 17/06; H01F 5/00; H01F 27/24

[52] U.S. Cl. .............................. 336/83; 336/178; 336/200; 336/212

[58] Field of Search .............................. 336/83, 178, 200, 336/212, 192

[56] References Cited

U.S. PATENT DOCUMENTS

| | | | |
|---|---|---|---|
| 5,010,314 | 4/1991 | Estou | 336/198 |
| 5,175,525 | 12/1992 | Smith | 336/83 |
| 5,386,206 | 1/1995 | Iwatani et al. | 336/200 |

OTHER PUBLICATIONS

"New Common–mode Choke Structure for Switchmode Power Supplies" by West and Dickstein, *Powertechnics Magazine*, Nov. 1985, p. 29.

"Integrated–Magnetics Design with Flat, Low–Profile Cores" by Cuk et. al., CALTECH Power Electronics Group Publication, 1989, 13 pages.

"Planar Magnetics Simplifies Switchmode Power Supply Design and Construction," by E. Brown, *PCIM Magazine*, Jul. 1992, pp. 46–52.

*Primary Examiner*—Cassandra C. Spyrou
*Assistant Examiner*—Raymond M. Barrera
*Attorney, Agent, or Firm*—James A. Gabala

[57] ABSTRACT

Disclosure is made of an integrated-magnetic apparatus, comprising: winding structure for insulatingly carrying at least two generally flat, laterally offset and spaced apart electrical windings of a power converter around an aperture; a core having a flat exterior face, an interior cavity and an un-gapped core-column that is located within the cavity and that passes through the aperture of the winding structure; flat-sided surface carried by the core and forming an interior chamber that is located adjacent to the flat face of the core and forming a core-column that has a gap and that is located within the chamber; and structure, located around the gapped core-column, for carrying a third electrical winding of the power converter. The first two electrical windings are substantially located within the cavity and are adapted to be transformingly coupled together through the core. The third electrical winding is adapted to be inductively coupled through the gapped core-column to the other electrical windings, and is phased to have the magnetic flux passing through the gapped core-column substantially in the same direction as the magnetic flux passing through the un-gapped core-column and to have substantially the same AC components of flux in the gapped core-column and in the un-gapped core-column.

30 Claims, 9 Drawing Sheets

INTEGRATED-MAGNETIC APPARATUS

GOVERNMENT INTEREST

This invention was made with Government support under a contract (SBIR NAS7-1225) awarded by the National Aeronautics and Space Administration (NASA). The Government has certain rights in this invention.

TECHNICAL FIELD

This invention relates to the general subject of integrated-magnetics and, in particular, to integrated-magnetic apparatus having a flat or planar form.

BACKGROUND OF THE INVENTION

The advantages of distributed power are well known: by busing a relatively high voltage to a DC-DC converter near a load, distributed power architecture minimizes distribution losses and provides a stable voltage under variable load conditions. The size of the DC-DC converter restricts or limits how dose it can be to the circuitry it powers, not to mention the overall space penalty it imposes at the system level. Therefore, a major design objective is often to keep the power density as high as possible.

In many applications, converter networks may be required to produce more than one output voltage (or current for a current-controlled application). Also, there are applications where the converter system may need to accommodate more than one input source of power, such as an uninterruptible power supply (UPS) application. In addition, all practical converter system applications demand the presence of input filter networks to reduce conducted current emission levels from high-speed converter switching operations to acceptable magnitudes.

The net result is that more power magnetic components, such as an input filter inductor in line with the input power source, more transformer windings (possibly both primaries and secondaries) and/or more output filter inductances for the added output lines, are added to a basic converter network.

Increased power density is a mixed blessing. On one hand, it gives the same output or functionality in a smaller package; on the other hand, the converter package has less surface area to dissipate heat. Raising power density also can raise the operating temperature of the converter, which often affects the reliability of components. Thus, increased power density becomes a counter-productive design objective if oversized heat sinks and noisy power-hungry fans are needed to augment the heat transfer rate of the converter package.

Integrated-magnetics (IM) is one innovative approach that has been exploited in the design of power converters. An overview of integrated-magnetics and power converters is presented in the book "Modern DC-to-DC Switchmode Power Converter Circuits" by Severns and Bloom. By "integrated-magnetics" is meant the combining, "lumping" or blending together of magnetic components (e.g., transformers, inductors, etc.) of a switchmode power converter into single physical assemblies with little or no compromise in conversion characteristics.

Historically, integrated-magnetic systems have been constructed using conventional E-E or E-I core structures, wound bobbins and hard-wired connections. See "New Common-mode Choke Structure for Switchmode Power Supplies" by West and Dickstein, *Powertechnics Magazine*, November 1985, p 29. Flat IM systems and planar magnetics research, as applied to certain specialized converters, has been reported "Integrated-Magnetics Design with Flat, Low-Profile Cores" by Cuk et. al., CALTECH Power Electronics Group Publication, 1989, 13 pages. However, the application of planar IM concepts to conventional converter and inverter topologies does not appear to have been explored.

SUMMARY OF THE INVENTION

A general object of the invention is to provide a practical and low-cost design of a planar integrated-magnetic (PIM) power magnetics for switchmode power-processing circuits.

Another object of the invention is to combine the transformer and energy-storage components of switchmode converter circuits by using low-profile multi-chambered magnetic core enclosures and small printed-circuit elements for winding implementations.

Still another object of the invention is to provide a unique construction concept to the implementation of integrated-magnetic power components in simple, low-cost planar formats.

One specific object of the invention is to provide practical PIM structures for high power-processing systems, specifically those forms often found in DC power processor networks used in electronic equipment for aerospace and aircraft applications.

In accordance with the present invention, an integrated-magnetic apparatus is disclosed. The apparatus comprises: generally flat electrical insulating means for insulatingly carrying at least two generally flat, laterally offset and spaced apart electrical windings for a power converter around an aperture located therein; a generally flat-faced core having an interior cavity and having an un-gapped core-column that is located within the cavity and that passes through the aperture of the insulating means, wherein the at least two electrical windings are substantially located within the cavity and are adapted to be transformingly coupled together through the core; flat-sided means, carried by one of the flat faces of the core, for forming an interior chamber that is located adjacent to one flat face of the core and for forming a core-column that has a gap and that is located within the chamber; and printed circuit board means, carried within the flat-sided means and around the gapped core-column, for carrying at least one electrical winding for the power converter, wherein the at least one electrical winding is substantially located within the annulus, is adapted to be inductively coupled through the gapped core-column to the two generally flat and laterally offset electrical windings and is phased to have the magnetic flux passing through the gapped core-column substantially in the same direction as the magnetic flux passing through the un-gapped core-column and to have substantially the same AC components of flux in the gapped core-column and in the un-gapped core-column.

The planar method used to achieve the PIM construction has been found to be simple and easy to assemble. It also permits the elimination of a significant amount of magnetic core material when compared to a conventional "discrete" inductor component and transformer assembly of equivalent electrical and magnetic performance capabilities. Moreover, tests of prototype structures have shown that insignificant magnetic interaction exists between the inductive components of the PIM core structure, permitting planar consolidation of their functions in simple and easy-to-assemble ferrite core arrangements.

Core material savings was made possible by using a flat-faced core having a center core "plate" as a common flux path for both "transformer" and "inductor" magnetic actions. Moreover by proper phasing of the "inductor" winding of the PIM core structure with respect to that of the primary winding, excursions in flux in the common core center plate, due to action of the primary winding, subtract from the DC and AC flux level actions in the inductor winding. The result is that the net flux excursion in the common core center plate is smaller which, in turn, permits the effective cross-sectional area of the center plate to be smaller than the case when the transformer and inductive flux components are additive. In addition, the air gap in one part of the PIM core structure permits very little transformer-related flux to be developed in that part of the PIM core structure, since the reluctance value of the air-gapped core column will be much greater than that posed by the un-gapped core-column of the opposite part of the PIM assembly.

The demonstrated savings in core weight and volume achieved, over equivalent planar "discrete" versions of a transformer and an inductor in a simple forward converter design, has been shown to be on the order of 17%.

The development of the invention has also led to unique extensions of PIM concepts that permit many essential power magnetic functions of a switchmode power-processing network to be included. The potential of the invention is significant, in that new methods for building low-cost power magnetic systems will be available for developing new power converter and/or inverter circuits. The commercial use of these concepts is even more significant, since most, if not all, industrial power supply systems use power magnetic components.

In summary, the inventive concepts disclosed herein have been shown to produce viable PIM devices that can realize significant volume and weight savings, when compared to equivalent "discrete" magnetic devices. These concepts also yield a magnetic system of equivalent electrical and magnetic performance with no discernible compromise. The closed core structure of the basic embodiment of the invention also provides an effective containment method to reduce magnetic leakage. Also, this core structure provides more exposed surface area for removal of heat developed in the PIM device due to power losses in the planar winding boards, and in the bodies of the core-pieces themselves from magnetic excitation and associated eddy currents in the material of the core-pieces.

Numerous other advantages and features of the present invention will become readily apparent from the following detailed description of the invention, the embodiments described therein, from the claims, and from the accompanying drawings.

DETAILED DESCRIPTION

While this invention is susceptible of embodiment in many different forms, there is shown in the drawings, and will herein be described in detail, several specific embodiments of the invention. It should be understood, however, that the present disclosure is to be considered an exemplification of the principles of the invention and is not intended to limit the invention to the specific embodiment illustrated.

Figure 3A:
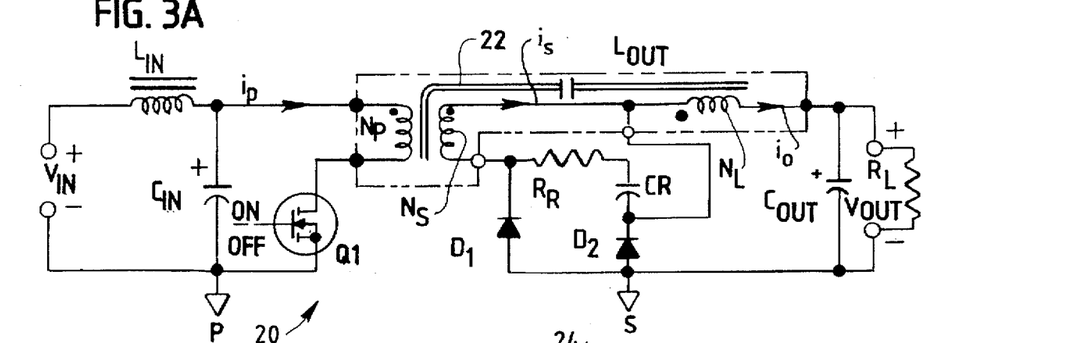
FIG. 3A is an electrical schematic diagram of a forward converter circuit for the integrated-magnetic apparatus of FIG. 2A or FIG. 2B.

First turning to FIG. 3A, a single-output IM forward converter 20 is depicted with an input filter network, comprising an inductor $L_{in}$ and a capacitor $C_{in}$. A forward converter is a widely used power converter configuration, and one whose operation is well known to those skilled in the art. Nevertheless, it should be understood, in the discussions that follow, that the subject matter of the invention is not limited to any one converter topology or the number of inputs or outputs of a converter. The IM component of the converter 20 comprises a common magnetic core 22 that carries a primary transformer winding $N_p$, a secondary transformer winding $N_s$, and an output inductor $L_{out}$ winding $N_L$. An input voltage $V_{in}$ is applied to the input filter network. Energy stored in the capacitor $C_{in}$ of the input filter is periodically transferred to an output load $R_L$, $L_{out}$, and an output filter capacitor $C_{out}$ through the transformer windings in conjunction with a secondary diode $D_1$ whenever primary power switch $Q_1$ is in an ON-state during a switching cycle. When the switch $Q_1$ is in an OFF-state, energy for output load power is provided by the output inductor $L_{out}$ through a secondary diode $D_2$. During this same OFF period, magnetic reset of the transformer part of the IM assembly is accomplished by resonant action of a network formed by a resistor $R_R$, a capacitor $C_R$ and the effective inductance of the secondary transformer winding $N_S$. Output voltage or current control is accomplished by regulating circuitry (not shown for simplicity and known to those skilled in the art) which adjusts the ON and OFF times of the power switch $Q_1$ during switching periods of power conversion.

Figure 1A:
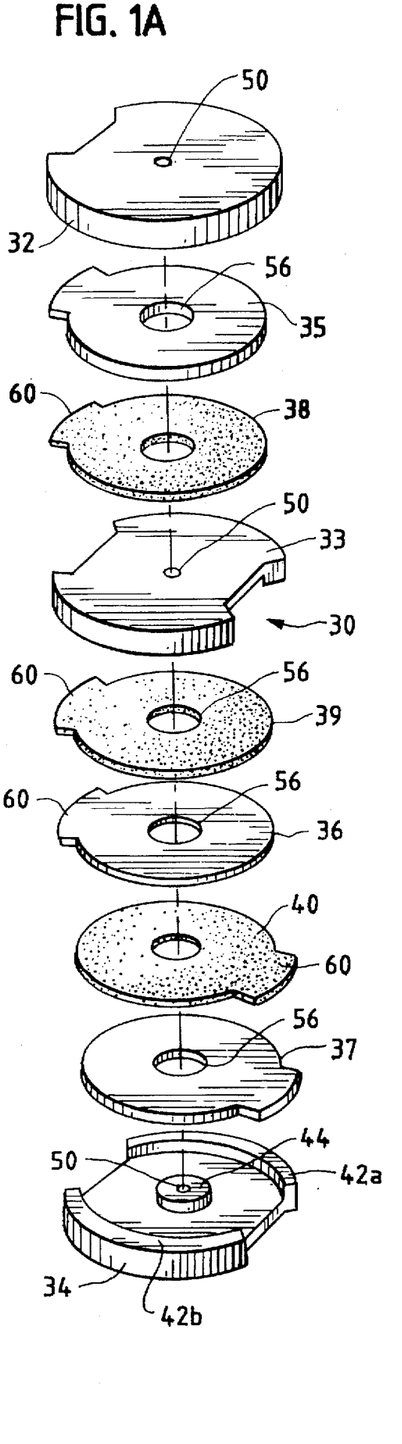
FIG. 1A is an exploded assembly diagram of one embodiment of the integrated-magnetic (IM) apparatus that is the subject of the present invention.
Figure 2A:
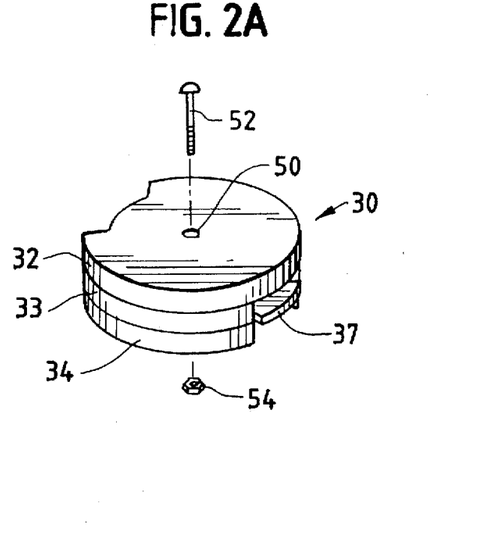
FIG. 2A is a perspective view of the assembled integrated-magnetic apparatus of FIG. 1A.

Referring to FIGS. 1A and 2A, one embodiment of an integrated-magnetics apparatus 30 is illustrated. That apparatus comprises a stack of: three circular shaped, wafer-like planar core-pieces or core-forms 32, 33, and 34; three electrical winding disks 35, 36 and 37; and a plurality of electrical insulating disks 38, 39 and 40.

Figures 5A, 5B:
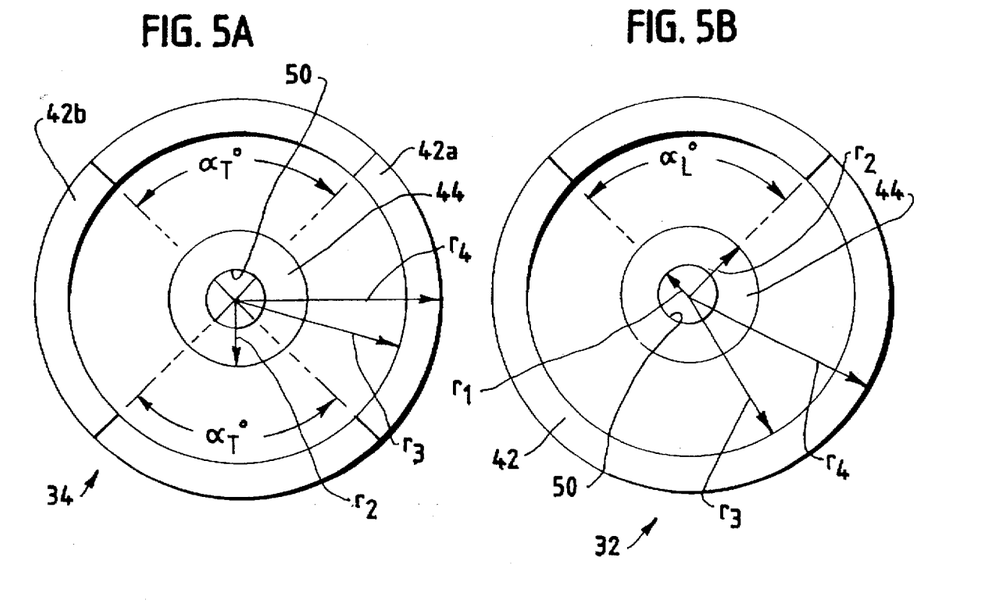
FIGS. 5A and 5B are plan views of two core components of the integrated-magnetic apparatus of FIG. 1A.

Looking at the lower-most or bottom core-piece 34 (Also see FIG. 3B, for example), each core-piece has two opposite generally flat sides 34a and 34b, has a circumference, has a diameter, and has a thickness that is thin relative to its diameter. One side of each core-piece carries at least one relatively thin arcuate shoulder 42 and a core-column 44 (Also see FIGS. 5A and 5B). Each shoulder 42 is located on at least one of the sides of the base and closely adjacent to the circumference of the base. The core-pieces 32, 33 and 34 are formed from a ferromagnetic material (e.g., ferrite). The shoulders 42 have substantially flat tops and, together with its core-column 44 and an adjacent core-piece, form at least part of an interior cavity, void or chamber 46. In the embodiments illustrated, the core-column 44 is in the form of a circular post that is located on at least one of the adjacent sides of the two core-pieces forming the interior cavity 46 and at the center of the core-piece. The core-columns 44 have tops that are substantially even with the tops of the shoulders 42.

The shoulders 42 of the core-pieces have ends (See FIGS. 5A and 5B) that are laterally separated from each other to form at least one "opening" along the circumference and into the interior cavity 46. The function of the "openings" (See FIG. 9) is to accommodate the required winding connections needed to interface the IM assembly with other parts of the converter's electrical circuitry. In making these "openings," it is desirable to keep their effective widths as small as possible, since the effective area removed by their presence is not usable to any great degree by magnetic flux levels within the apparatus. Therefore, the widths of the "openings" must be taken into account when estimating the effective reluctances of the core-pieces forming the assembly.

Figure 3B:
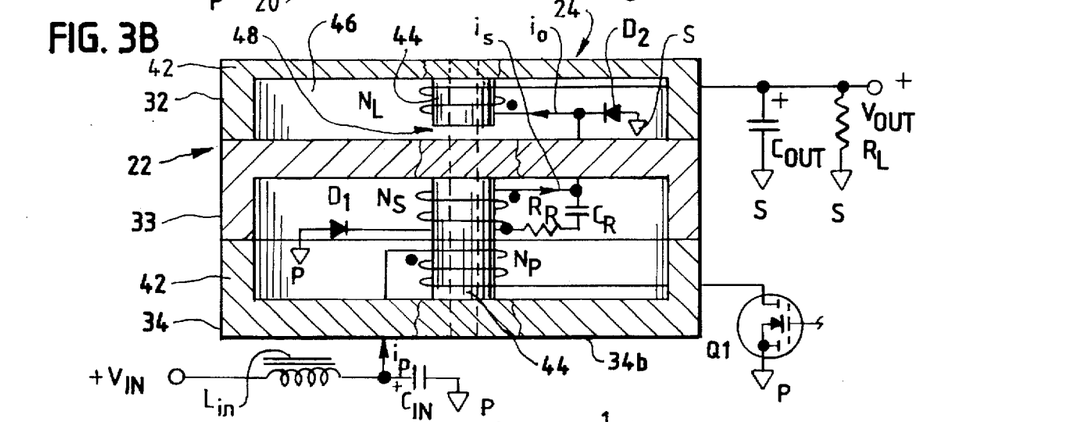
FIG. 3B is an electrical schematic diagram of a forward converter circuit in combination with a cross-sectional side view of the assembled integrated-magnetic apparatus of FIG. 2A or FIG. 2B.

As shown in FIG. 3B, the upper core-piece 32 (and/or the center core-piece 33) has an air gap 48 located in its center post or core column 44 to achieve the desired inductance value for the output inductor part of the apparatus. Ideally, no air gap would be needed in the bottom center post 44, although a small one can be added here to control effective magnetization inductance values of the transformer windings. This latter air gap can be achieved by inserting a flat thin insulator between the ends of the abutting core-columns of the two lower core-pieces 33 and 34, or by using a physical air gap in either of these core-pieces.

Figure 4:
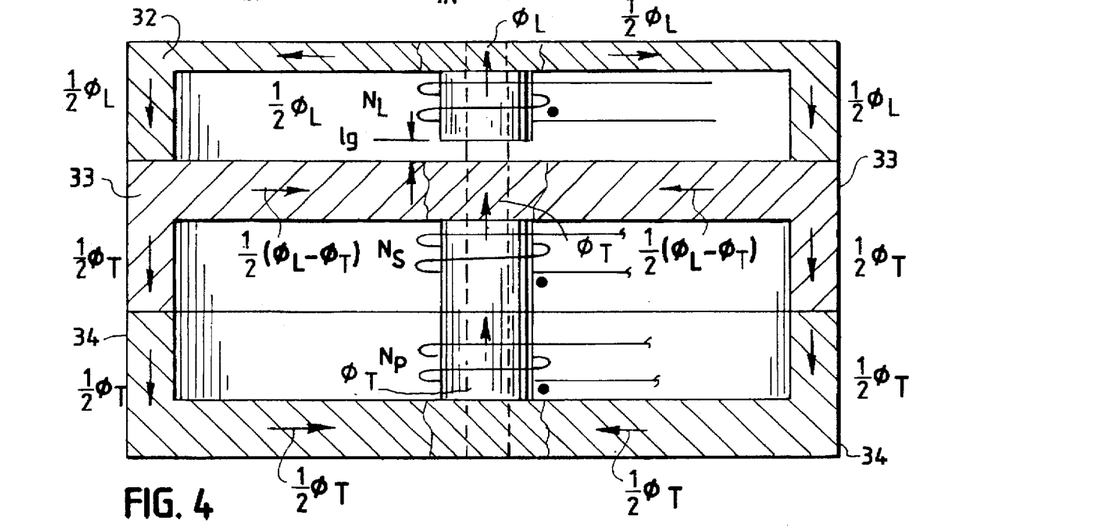
FIG. 4 is an enlarged cross-sectional view of assembled integrated-magnetic apparatus of FIG. 1A illustrating magnetic flux paths.

As shown in FIG. 4, the presence of the air gap 48 in the center post 44 of the upper core section 32 essentially prevents any significant amount of flux developed by the transformer actions of the lower section, because the effective reluctance of the core path presented by the air gap will be much greater than that of the center post 44 area in the lower part of the apparatus 30. In FIG. 4, fluxes related to inductive action in the upper part of the apparatus 30 are labeled as $\varnothing_L$, while fluxes related to transformer actions are labeled as $\varnothing_T$. The center posts 44 of the apparatus 30 will have the highest flux levels and the symmetry of the structure will cause those center post fluxes to split in half in the legs of the core structure 22 surrounding the center posts.

Finally, to physically hold the entire apparatus 30 together, a small hole 50 is added in each core-piece's center to permit a simple screw 52 and nut 54 combination (See FIG. 2A) to be used for this purpose. This hole 50 may be eliminated if the core-pieces are "glued" together after assembly, a securing method also commonly used in practice today.

Figure 2B:
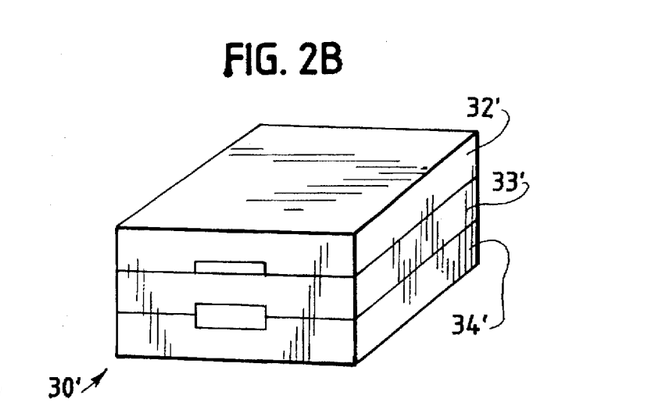
FIG. 2B is a perspective view of another embodiment of an integrated-magnetic apparatus that is the subject of the present invention.

The shape of the core assembly 30 and 30' in FIGS. 2A and 2B is indicative of a "pot" core arrangement composed of three separate pieces of core material 32, 33 and 34 that form the "bottom", "center" and "top" part of the planar IM (PIM) apparatus 30. The top part of the PIM apparatus 30 is used to house at least one inductor winding $N_L$ of the converter, and the bottom part houses the transformer windings $N_P$ and $N_S$. The centermost core-piece 33 is used to physically separate the upper and lower parts of the core structure 22, and to serve as a "common" material path for both the inductive flux developed in the upper part and that flux developed by transformer actions in the lower part of the structure. The "wall" of core material around all sections of this structure serves to contain leakage fluxes of all windings within the PIM apparatus.

The structure of FIGS. 2A and 2B have the following desirable features:

(1) Only two winding assemblies (or areas),
(2) Transformer windings physically close to one another,
(3) Balanced core window areas,
(4) Minimized magnetic interaction between transformer and inductor functions,
(5) Minimized external interconnections to a converter circuit,
(6) Complete magnetic flux containment,
(7) Minimized PIM assembly time for low labor costs, and
(8) No winding bobbins are required.

Figure 6A:
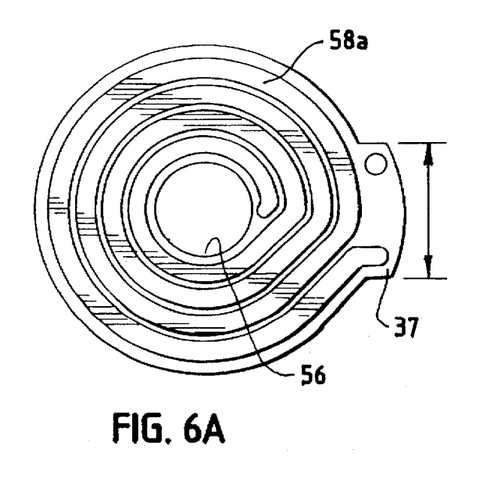
FIGS. 6A and 6B are plan views of two sides of a transformer winding component of the integrated-magnetic apparatus of FIG. 1A.
Figure 6B:
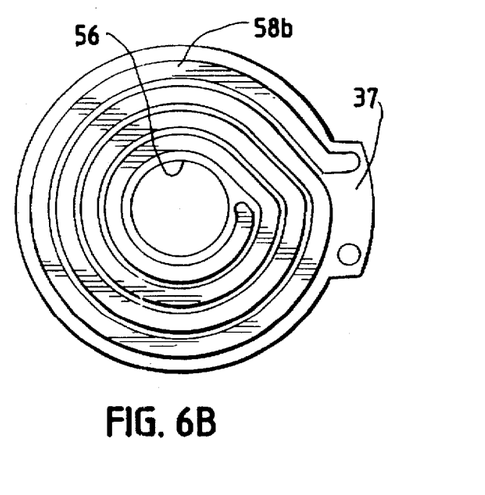
Figure 7A:
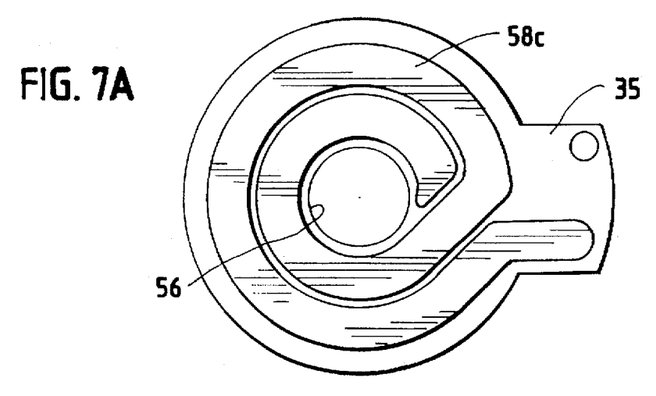
FIGS. 7A and 7B are plan views of two sides of an inductive winding component of the integrated-magnetic apparatus of FIG. 1A.
Figure 7B:
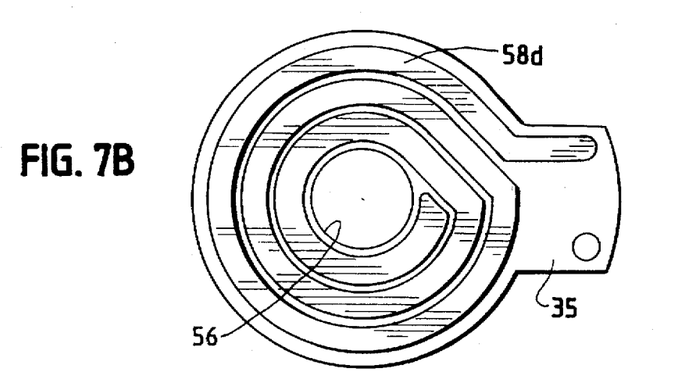

Returning to FIG. 1A, each electrical winding disk 35, 36 and 37 has two opposite generally flat sides, has at least one central aperture 56 between the two sides and insulatingly carries on at least one of its sides at least one flat electrical conductor 58a and 58b that is disposed generally spirally around the aperture 56. Preferably, each winding disk 35, 36 and 37 insulatingly carries two electrical conductors 58a and 58b that are disposed generally around the aperture 56. Each conductor 58a and 58b is physically and insulatingly separated from each other. The windings (See FIGS. 6A and 6B) of the disks 36 and 37 located in the lower chamber are transformingly coupled together through the core 22. The windings (See FIGS. 7A and 7B) of the disks 35 located in the upper chamber are inductively coupled to the core 22.

Figure 11:
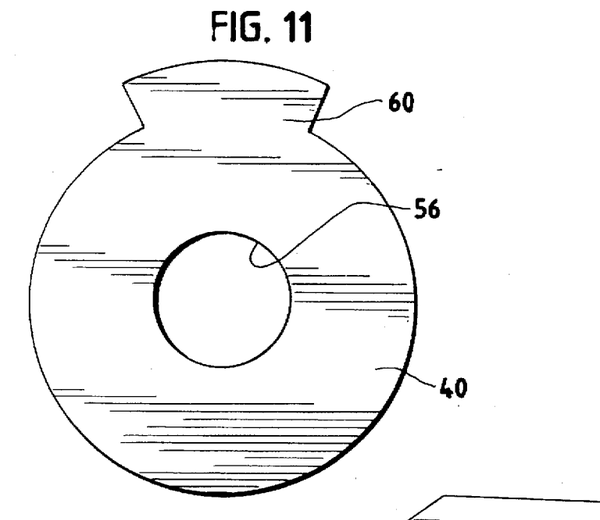
FIG. 11 is a plan view of an electrical insulating element.

When it is necessary to place two winding disks 36 and 37 on top of one another, insulation "disks" 40 are placed between them to prevent "shorted-turns" situations. These insulation disks (See FIG. 11) are normally made of a thin insulation material (e.g., Kapton or Mylar). The thicknesses of the insulation disks are, of course, dependent on the voltage breakdown level needed between turns of a winding, and can range from 0.5 mil to over 10 mils in many practical design situations.

Each winding disk and insulating disk carries a tab-like extension or "wing" 60. The wings pass through the access slots formed by the core-pieces and facilitate alignment of the components of the apparatus during assembly. Only one access slot should be needed for the top core-piece 32 of FIGS. 3A or 3B, while the bottom core-piece 34 would need two slots for the tabs or wings 60 of the primary and secondary winding PCBs, respectfully.

Modern printed-circuit board (PCB) technologies have been employed to achieve "flat" winding assemblies that can be "rigid" in structure, physically "flexible" or designed to be rigid in certain regions and flexible in others (e.g., winding region rigid with flexible "leads" for interconnect purposes). The "rigid" approach is commonly used, primarily since it is the lowest cost construction technique. Also, for cost reasons, this form of PCB construction is normally restricted to "doubled-sided" approaches (i.e., windings present on only two layers of the PCB base material), with much more expensive "multi-layer" PCB constructions normally used in special instances where capacitances between layers of windings must be tightly controlled and/or reduced.

Figure 8A:
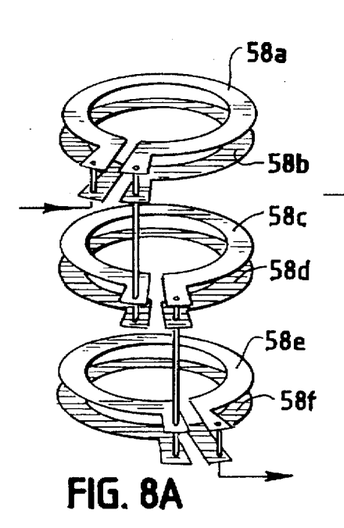
FIGS. 8A, 8B and 8C are schematic diagrams of examples of how winding components can be electrically connected together.
Figure 8B:
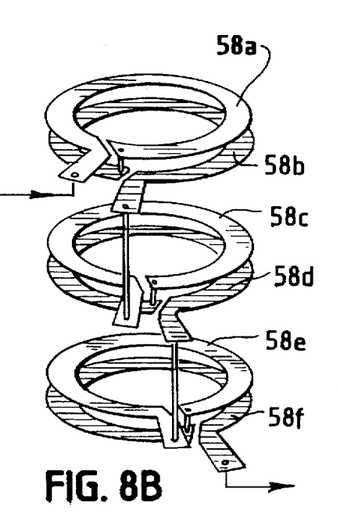
Figure 8C:
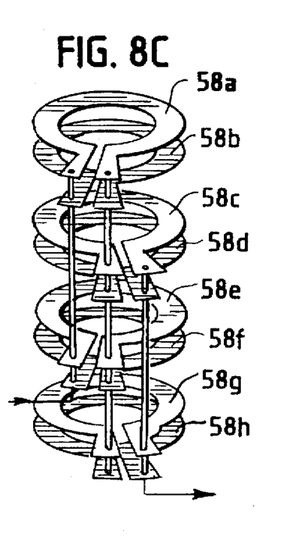

FIGS. 8A, 8B and 8C depict three examples of how simple doubled-sided PCB winding assemblies can be externally interconnected via simple wire methods to achieve higher current capacity and/or higher total turn count for a winding. In particular, FIG. 8A illustrates how the "windings" 58 of three double-sided circuit boards are connected in series with each other (i.e., winding 58a is in parallel with winding 58b and both are in series with windings 58c and 58d). FIG. 8B illustrates how the "windings" of three double-sided circuit boards are connected in series with each other, wherein each winding on one face of the board is in parallel with the winding on the other side (i.e., winding 58a is in series with winding 58b and in series with windings 58c and 58d etc.). FIG. 8C illustrates how the "windings" of four double-sided circuit boards are connected in parallel with each other, wherein each winding on one face of the board is in parallel with all other windings.

Planar PCB constructions, like those shown in FIGS. 8A, 8B and 8C, have the advantage of eliminating the need for winding bobbins when constructing a magnetic component, since the PCB base material, an electrical insulator/non-conductor, serves as the supporting structure for the windings. In some special cases where the windings must be physically large to handle large current magnitudes, the windings themselves can be "stamped" from steel or other conductive materials. In such cases, the windings because of their size and mass can be "self-supporting," requiring no supporting base or bobbin. Bobbins, if present, serve only to establish tightly controlled clearances between the windings and the core pieces of the structure (See "Planar Magnetics Simplifies Switchmode Power Supply Design and Construction," by E. Brown, *PCIM Magazine*, July 1992, pp 46–52).

It also is possible to use a single multi-layer PCB to realize a multiplicity of planar windings, such as the technique reported recently for a planar IM approach for a transformer-isolated Cuk converter topology (See "Integrated-Magnetics Design with Flat, Low-Profile Cores" by Cuk et. al., CALTECH Power Electronics Group Publication, 1989, 13 pages). The general method would apply to almost any converter topology, including the forward converter shown in FIG. 3B.

Flex-circuit PCBs, from single to multi-layer constructions, instead of the rigid board assemblies previously discussed are practically feasible. The PCB would be of a "doubled-sided" construction, containing winding patterns on both sides, with interconnecting vias. The windings of each leg are then formed by "Z-folding" the PCB before placing into the body of the core structure. As far as the actual construction means used for this PCB, it could be totally flexible in character, or be of a "rigid-flex" nature where the PCB is only "bendable" at a specified "fold" line. Insulation layers would need to be added between layer folds of windings, which complicates assembly of this concept to some degree.

The multi-layer rigid PCB construction and an equivalent flexible double-sided PCB approach have the distinct disadvantage of being much more costly that the simple combination of a number of smaller, rigid, double-sided PCB's for each leg of the IM apparatus. Also, because the multi-layer and flexible PCB schemes place all windings on a common base layer of material, any change in turns, etc. for any leg of a PIM structure would require the entire PCB to be changed. Therefore, a good starting point in any design is to use winding PCB's of the double-sided, rigid variety for the PIM apparatus. This approach has the advantages of keeping developmental costs within reason and accommodating any changes required in the number of winding turns in the fabrication work in early design phases.

Turning to FIGS. 9, 10A, 10B and 10C, a more detailed design of an 10 integrated-magnetic apparatus 30 is illustrated. It generally follows the design depicted in FIG. 3B. Here, the inductor winding sits on a gapped leg 44 situated above an un-gapped leg that carries the transformer windings. The core structure is characterized by two balanced window areas, one for the inductor windings and one for the transformer windings. Due to the symmetry of the core structure, the width of the "upper" and "lower" winding windows would be identical.

Note that no winding sits on any outside "leg" of this unique structure, and that all windings are mounted on core legs internal to the structure. Because of this, it is possible to "close" the structure almost entirely. Each chamber has access "slots" for bringing out PCB winding interfaces. Assuming that the inductor winding $N_L$ is "phased" as shown in FIGS. 3A or 3B with respect to the primary winding $N_P$ with winding current directions indicated for all three windings, an estimate of flux directions in each part of the IM apparatus can be made. These estimates are shown in FIG. 4.

One area of note in FIG. 4 is that associated with the center plate or base of the core-piece 33 of the IM that separates the upper and lower core "chambers.". In it, both inductive and transformer-related flux elements occur, but they are not additive due to the phasing relationships chosen. In most operating situations, the peak magnitude of the inductive flux will be much higher than that produced by transformer actions, since the inductive flux will be composed of AC and DC components, while the transformer-related flux will be AC nature with ideally no DC component. Because the AC component of inductive flux could be on the order of that of the AC transformer flux, these two AC components can cancel one another in this PIM design, leaving only the DC component of inductive flux in the center plate part of the core of the PIM assembly. From a cross-sectional area viewpoint, this fact implies that the effective area of this center plate could be not any bigger than that of the base or top plate upper core-piece 32, and can be made smaller in effective area without introducing the possibility of saturating the core material of the center plate of core-piece 33.

Figure 9:
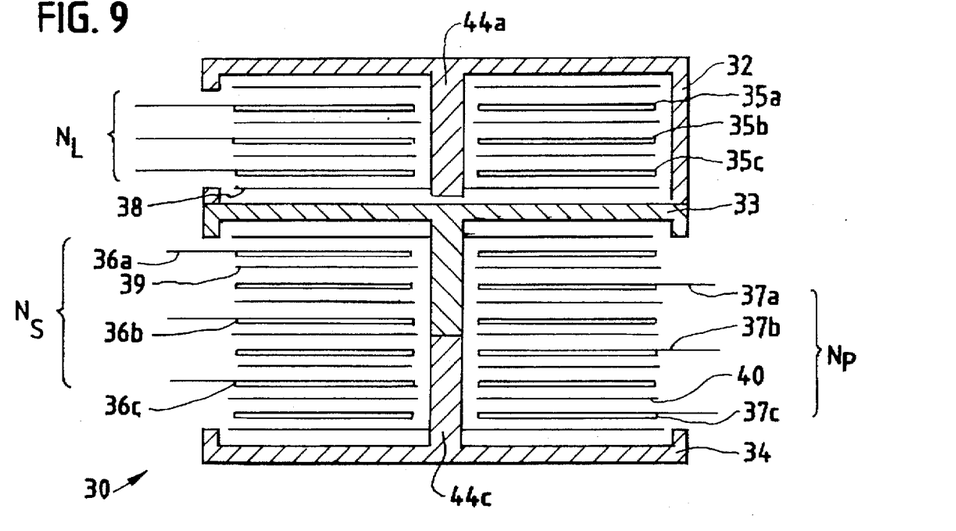
FIG. 9 is a cross-sectional schematic diagram of the assembled integrated-magnetic apparatus of FIG. 2A or FIG. 2B.
Figure 10A:
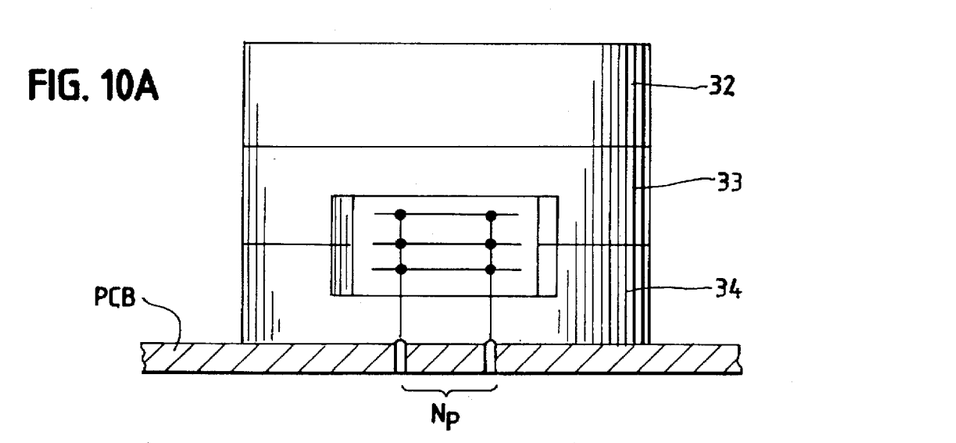
FIG. 10A is an elevational exterior view of the right side of the integrated-magnetic apparatus of FIG. 9 installed on a circuit board.
Figure 10B:
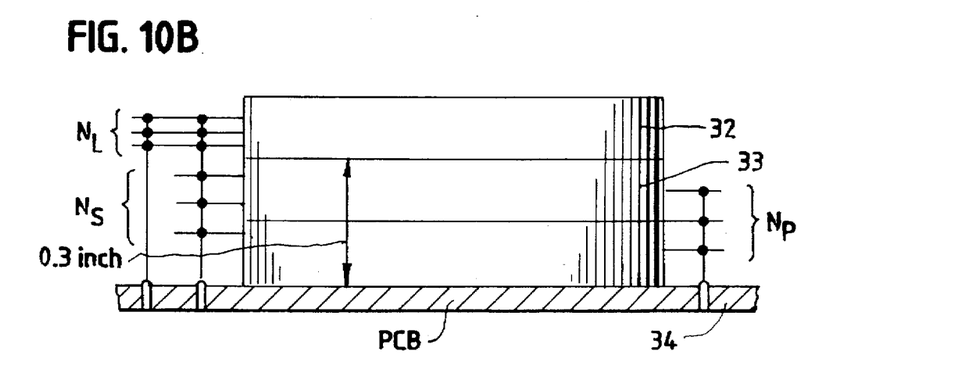
FIG. 10B is an elevational exterior view of the integrated-magnetic assembly of FIG. 9 installed on a circuit board.
Figure 10C:
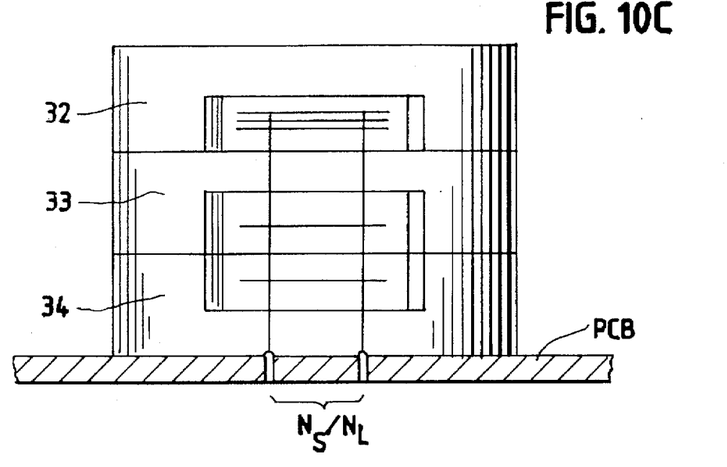
FIG. 10C is an elevational exterior view of the left side of the integrated-magnetic apparatus of FIG. 9 installed on a circuit board.

From a functional viewpoint, the apparatus of FIGS. 4 or 9 can yield a blended and non-interactive replacement for the inductor(s) and the transformer of a conventional converter; moreover, its overall size and weight will be smaller than the combined size and weight of discrete planar versions of these two magnetic components for comparable operational conditions and specifications.

Figure 12A:
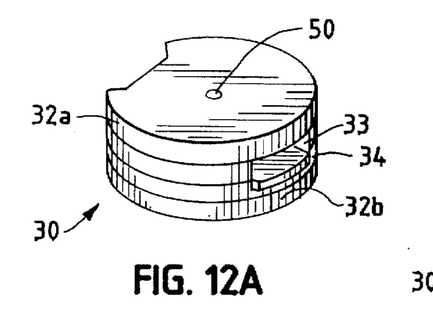
FIGS. 12A and 12B are perspective views of additional embodiments of the present invention.
Figure 13A:
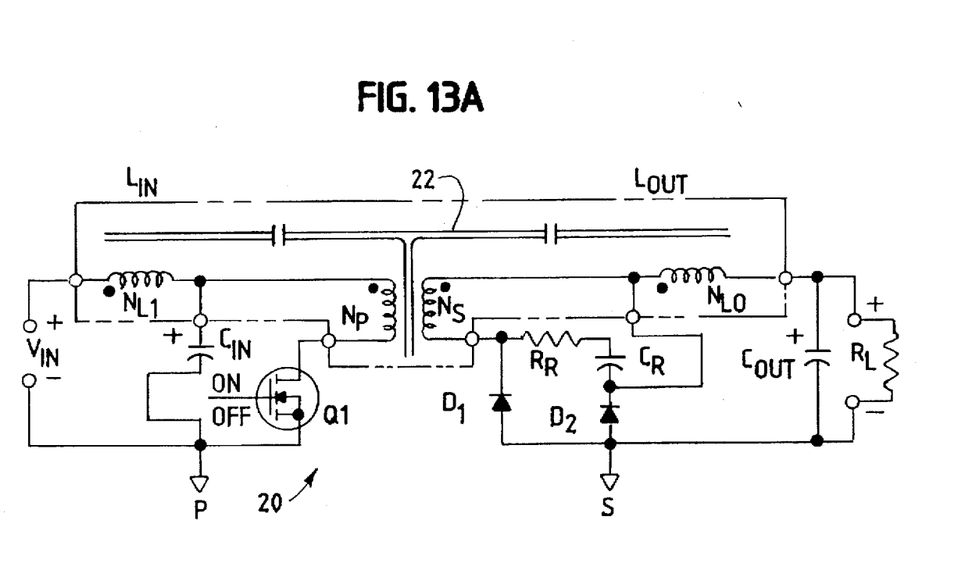
FIG. 13A is an electrical schematic diagram of a forward converter circuit and an input filter in combination with a cross-sectional side view of the assembled integrated-magnetic apparatus of FIG. 12A or FIG. 12B.
Figure 13B:
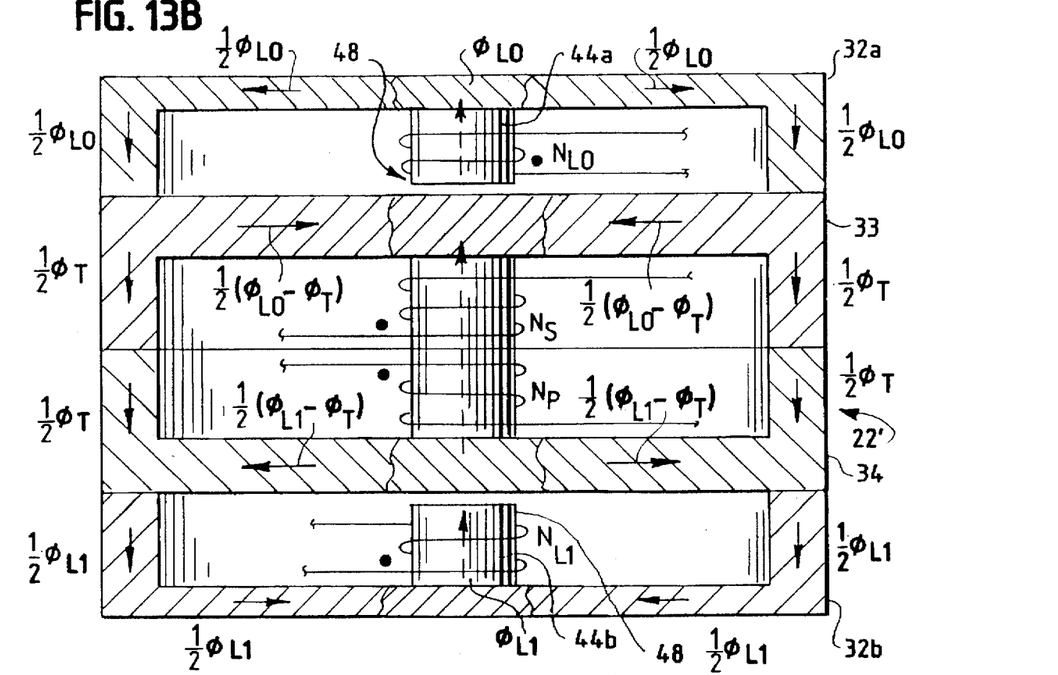
FIG. 13B is an enlarged cross-sectional view of the integrated-magnetic apparatus of FIG. 12A or FIG. 12B illustrating magnetic flux paths.

Referring to FIG. 13A, an electrical schematic diagram is presented of a IM forward converter system, wherein the input filter inductor $L_{in}$ (noted earlier in FIG. 3A) is now included within the IM core assembly. FIG. 13B depicts a cross-sectional view of the converter system of FIG. 13A using the four-piece PIM magnetic core structure 22' depicted in FIG. 12A (i.e., circular, cylindrical or pot-core in shape). Using FIG. 13B, the various flux elements and their directions can be defined. Note that, here the phasing of the input filter inductive winding added in the new "bottom" core-piece 32b is selected so that the base of the core plate 34, separating this new core-piece and the transformer section of the PIM assembly, will have flux components that cancel, in the same manner as was done for the PIM assembly depicted in FIG. 4. Once again, there is an air gap in the core-column 44b of this new bottom core-piece 32b to achieve the desired amount of filter inductance and to prevent any discernible amount of transformer-related flux from appearing in the center-post or core-column of this new core-piece.

Assuming that the added input inductor assembly (containing windings $N_{L1}$) has the same core dimensions as that of the other core-pieces 32a, 33 and 34, the estimated core volume savings of the four-section PIM design of FIG. 13B can be on the order of double that estimated for the three-section PIM design of FIG. 3B, or can be on the order of about 34%.

Figure 14:
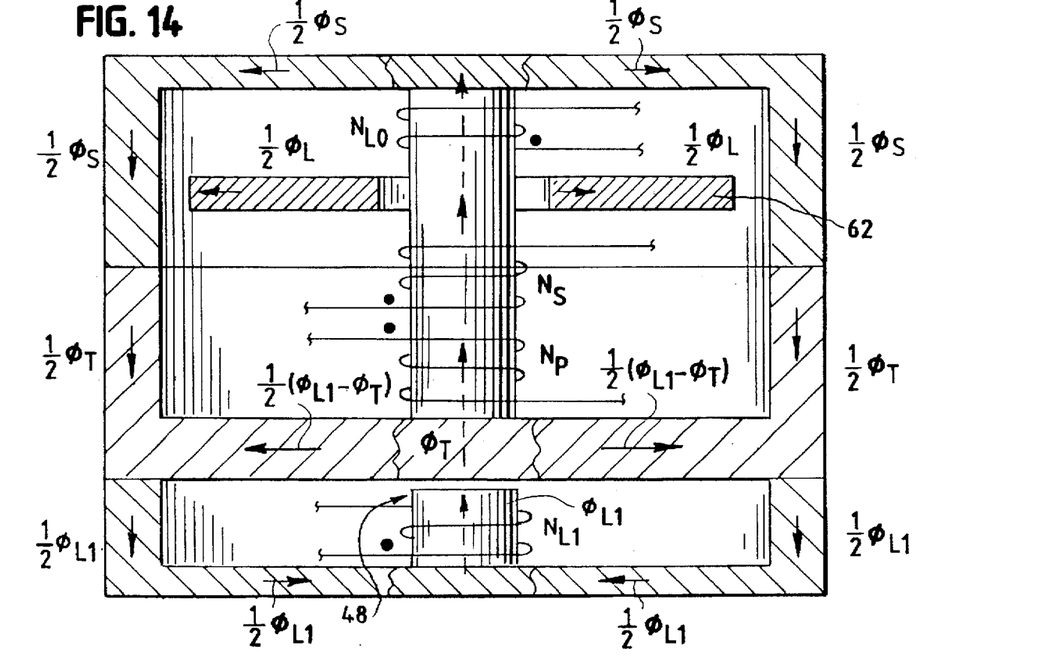
FIG. 14 is an enlarged cross sectional view of another embodiment of a planar integrated-magnetic apparatus.
Figure 15A:
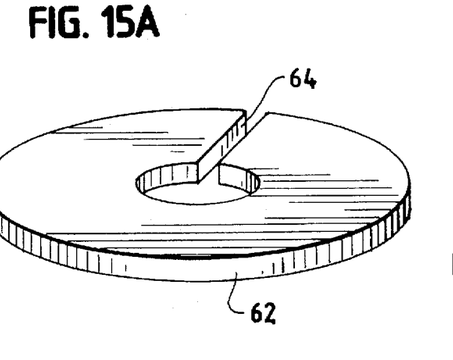
FIGS. 15A and 15B are perspective views of two forms of the reluctance disk shown in FIG. 14.
Figure 15B:
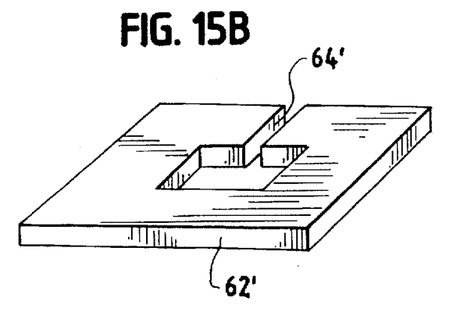

Another PIM design concept is shown in the structural diagrams of FIGS. 14, 15A and 15B. There, the "center plate" or core-piece separating the output inductor portion of the PIM assembly and the lower transformer part has been removed. Instead of this plate or piece a smaller reluctance disk 62 is added physically between the upper inductor windings $N_L$ and the transformer windings $N_S$ and $N_P$ to provide a controlled leakage flux path.

This path can provide sufficient output filter energy storage for proper converter operation while allowing the removal of even more core material from the PIM structure at the expense of the addition of a narrow disk of ferrite material 62 sandwiched between inductive and transformer printed-circuit windings. A conceptual drawing of this disk 62 is shown in FIG. 15A for a "pot-core" shaped PIM assembly (See FIG. 12A). Note that a slight cut 64 through the body of the reluctance disk 62 is needed to prevent a "shorted" turn situation, when it is placed inside the chamber of the core formed by 15 core-pieces 33 and 34.

Reluctance disk concepts provide controlled leakage inductances between strictly inductive windings in the upper and lower chambers of the four-section PIM apparatus similar to that of FIG. 14. With the ability to accurately predict the amount of leakage inductances these disks introduce between windings, the inductive parts of the PIM structure can be designed to control, direct and/or reduce AC ripple current magnitudes in selected inductive windings attached to both the input and output terminals of the converter circuit.

Figure 16:
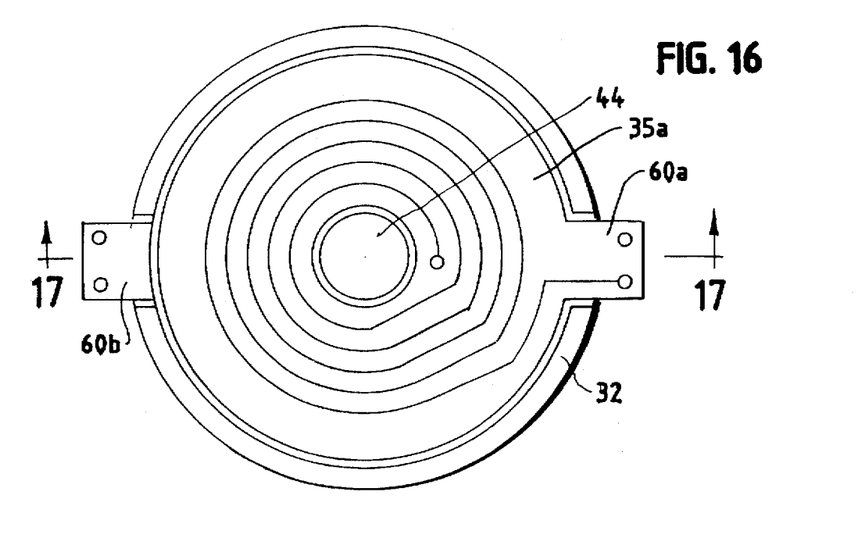
FIG. 16 is a cross-sectional plan view of the integrated-magnetic apparatus of FIG. 14 as viewed along line 16—16 of FIG. 17.
Figure 17:
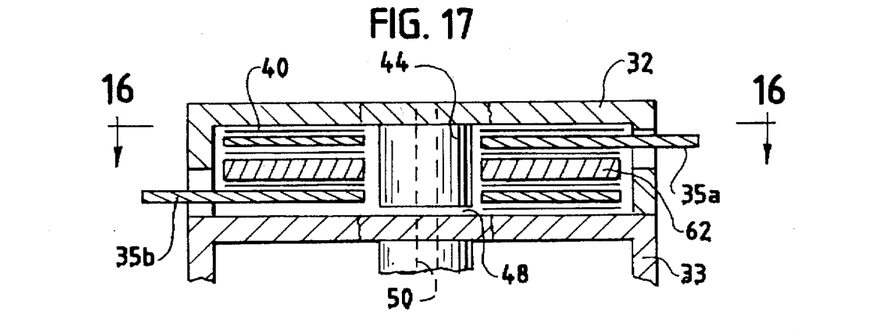
FIG. 17 is a partial, cross-sectional view of one end of the integrated-magnetic apparatus of FIG. 14.

The reluctance disk concept for leakage inductance control is depicted in FIGS. 16 and 17. Here, the upper part of the PIM apparatus is shown with two inductor winding boards 35a and 35b, as an example, and with the reluctance disk 62 physically placed between these boards. By controlling the dimensions of the disk 62 (i.e., diameter and thickness) and its distances from the inner center post 44 and from the inside edges of the core-piece 32 forming the upper core chamber, it is possible to closely predict the effective leakage inductance that this disk presents relative to the two inductor windings. The reluctance disk concept can be used to make a "low-ripple" current condition occur in a selected winding. The reluctance disk concept can also be applied to the lower interior chamber of an PIM assembly (e.g., see FIG. 13B) where input filter inductances of a converter system are to be located. In this location, the use of leakage inductance control can be applied in such a manner so as to significantly lower the input conducted AC current levels.

Figure 12B:
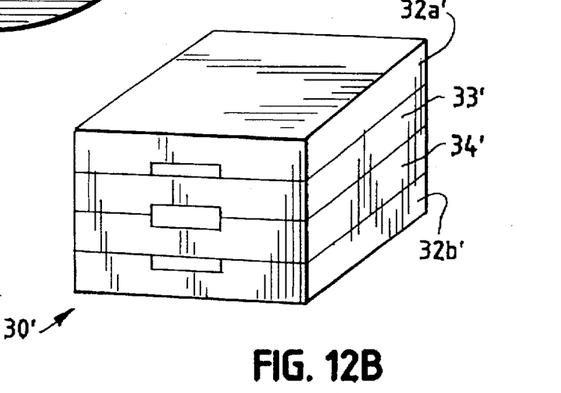

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, rectangular or box-shaped PIM devices are practical. These are illustrated in FIGS. 2B, 12B and 15B. A "box" form is more package-efficient from a mounting standpoint than is a circular or pot-core shape. From an effective surface area viewpoint, the "box" approach to the PIM may be better to dissipate heat developed in the unit, from core excitations and winding copper losses. Moreover, it is a form that could be manufactured at a lower cost than a circular, cylindrical or pot-core arrangement. However, due to the "square" or "rectangular" lengths of windings, effective winding resistances or copper losses can be higher than those in a circular winding board. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

I claim:

1. Integrated-magnetic apparatus, comprising:
   a) a first planar core-piece having two oppositely disposed sides and having an exterior;
   b) a second planar core-piece having two oppositely disposed sides, having an exterior and having one of its sides located proximately to one side of said first planar core-piece;
   c) cavity-forming means, carried by at least by one of the proximate sides of said first planar core-piece and said second planar core-piece, for forming a cavity between distal sides of said first planar core-piece and said second planar core-piece and for forming an un-gapped core element within said cavity;
   d) wafer-like electrical insulating means, having two opposite faces and an aperture that joins said faces and that is adapted to fit around said un-gapped core element, for carrying at least one electrical conductor adjacent to one of said two faces and generally spirally around said aperture, and for carrying at least an additional electrical conductor adjacent to the other of said two faces and generally helically around said aperture, said one electrical conductor and said additional electrical conductor forming a plurality of electrical windings that are substantially located within said cavity and that are transformingly coupled together in response to the flow of current through said one electrical conductor and a transforming magnetic flux thereformed and passing through said un-gapped core element and said first planar core-piece and said second planar core-piece;

e) insulating means, carried by at least one of said first planar core-piece and said second planar core-piece and said wafer-like electrical insulating means, for electrically insulating at least one of said one electrical conductor and said additional electrical conductor from at least one of said first planar core-piece and said second planar core-piece;

f) a third planar core-piece having one side that is located adjacent to one of said distal sides of said first planar core-piece and said second planar core-piece, having an opposite side and having an exterior;

g) hollow-forming means, carried at least by one of said third planar core-piece and said one distal side of said first planar core-piece and said second planar core-piece, for forming a hollow between the opposite side of said third planar core-piece and the other distal side of said first planar core-piece and said second planar core-piece and for forming a gapped core element within said hollow;

h) at least one wafer-like electrical insulating element carried generally within said hollow, having two opposite faces, having an opening that joins said faces and that is adapted to fit around said gapped core element, and having at least one electrical conducting element that is disposed generally around said opening, that forms at least one electrical winding within said hollow, and that is phased for inductively coupling to said plurality of windings through said gapped core element by an inductive magnetic flux that is produced in response to the flow of electrical current through said one electrical conducting element, that passes through said gapped core element and that is substantially in the same direction as said transforming magnetic flux passing through said un-gapped core element; and i) means for electrically insulating said one electrical conducting element from at least one of said first planar core-piece and said second planar core-piece.

2. The integrated-magnetic apparatus of claim 1, wherein at least one of said first planar core-piece and said second planar core-piece has an opening that joins its exterior to said cavity and wherein at least one end of said one electrical conductor passes through said opening.

3. The integrated-magnetic apparatus of claim 1, further including:

j) a fourth planar core-piece having one side that is located adjacent the other of said distal sides of said first planar core-piece and said second planar core-piece, and having an opposite side;

k) void-forming means, carried at least by one of said one side of said fourth planar core-piece and said other distal side of said first planar core-piece and said second planar core-piece, for forming a void between the opposite side of said fourth planar core-piece and said other distal side of said first planar core-piece and said second planar core-piece and for forming a gapped core element within said void;

l) a generally flat electrical insulating element carried generally within said void, having two opposite faces, having an opening that joins its faces and fits around said gapped core element in said void and having at least one electrical conducting element that is disposed generally around said opening, said one electrical conducting element forming at least one electrical winding that is within said void and that in response to the flow of current therethrough produces a magnetic flux that passes through said gapped core element in said void to inductively couple to said one electrical conductor and said additional electrical conductor that are in said hollow; and m) means for electrically insulating said one electrical conducting element in said void from at least said fourth planar core-piece.

4. The integrated-magnetic apparatus of claim 1, wherein said one electrical conducting element is electrically connected to said one electrical conductor.

5. The integrated-magnetic apparatus of claim 4, wherein said one electrical conductor is electrically connected to said additional electrical conductor.

6. The integrated-magnetic apparatus of claim 1, further including means, carried by said gapped core element and said un-gapped core element, for holding together said first planar core-piece and said second planar core-piece and said third planar core-piece.

7. The integrated-magnetic apparatus of claim 1, wherein said un-gapped core-element extends between said proximate sides of said first planar core-piece and said second planar core-piece.

8. The integrated-magnetic apparatus of claim 1, wherein said one electrical connector is laterally displaced from said additional electrical connector so as to minimize electrical capacitance between said one electrical connector and said additional electrical connector.

9. The integrated-magnetic apparatus of claim 1, wherein said magnetic flux passing through said gapped core element comprises a DC and an AC component; and wherein said magnetic flux passing through said un-gapped core element comprises substantially an AC component that has a magnitude that is on the order of the magnitude of said gapped core element.

10. The integrated-magnetic apparatus of claim 9, wherein said third planar core-piece has an effective area that is on the order of the effective area of said one distal side.

11. The integrated-magnetic apparatus of claim 1, wherein said plurality of windings and said electrical conducting element are connected together in the form of a buck-derived, forward DC-to-DC converter.

12. In a power converter having a plurality of windings that are transformingly connected together and inductively coupled to at least one other winding by means of a common flux path, an integrated-magnetic assembly, comprising:

a) generally flat means, having at least one aperture therethrough, for insulatingly carrying at least one electrical conductor that is disposed generally spirally around said aperture and for insulatingly carrying at least an additional electrical conductor that is disposed generally around said aperture and generally spaced apart from said one electrical conductor;

b) a core-form having two opposite generally flat sides, an interior cavity that is located between said two opposite generally flat exterior sides and having an un-gapped core-column within said cavity, said aperture in said generally flat means fitting around said un-gapped core-column in said cavity, said one electrical conductor and said additional electrical conductor forming a plurality of electrical windings that are located substantially within said cavity and that are adapted to be transformingly coupled together through a magnetic flux that is produced in response to the flow of current through said electrical windings and that passes through said un-gapped core-column in said core-form;

c) a generally flat core-element located next to one of said flat sides of said core-form, having an interior annulus that is located adjacent to said one side of said core-form and a core-column that has a gap and that is located within said annulus, said gap being located adjacent to said one side of said core-form; and d) a generally flat, disk-like electrical insulating element located within said annulus, having two opposite faces, having an opening that joins said faces and that is adapted to fit around said gapped core-column, and having at least one electrical conducting element that is disposed generally around said opening, said one electrical conducting element forming at least one electrical winding that is located within said annulus and that is inductively coupled to said plurality of windings in said cavity through a magnetic flux that is produced in response to the flow of current therethrough, that passes through said gapped core-column, that is substantially in the same direction as said magnetic flux passing through said un-gapped core-column and that has an AC component approximately the same magnitude as that of said magnetic flux in said core-form.

13. The integrated-magnetic assembly for the power converter of claim 12, further including means, located within said cavity, for electrically insulating said plurality of windings from said core-form.

14. The integrated-magnetic assembly for the power converter of claim 12, further including means, located within said annulus, for electrically insulating said one electrical winding from said core-element.

15. The integrated-magnetic assembly for the power converter of claim 12, wherein said core-form has at least one opening that joins said cavity to the exterior of said core-form; and wherein at least one of said one electrical conductor and said additional electrical conductor pass through said at least one opening.

16. The integrated-magnetic assembly for the power converter of claim 15, wherein said core-element has an opening that joins said annulus to the exterior of said core-element; and wherein said one electrical conducting element passes through said opening and is connected to one of said one electrical conductor and said additional electrical conductor.

17. The integrated-magnetic assembly for the power converter of claim 12, wherein said core-element comprises a flat thin insulator that is located between said core-column and said one side of said core-form so as to form said gap.

18. The integrated-magnetic assembly for the power converter of claim 12, further including a fastener, carried by said gapped core-column and said un-gapped core-column, for holding said core-element flatly against said core-form.

19. The integrated-magnetic assembly for the power converter of claim 12, wherein said core-form comprises: a first generally circular base having two opposite substantially flat sides, having a circumference and a diameter, and having a thickness that is thin relative to its diameter; two opposite relatively thin arcuate shoulders that are located on at least one of said sides of said first base and closely adjacent to said circumference of said first base, said shoulders having substantially flat tops and together with said first base forming at least part of said interior cavity; and a circular post that is located on said at least one side of said first base and between said shoulders, said post having a top that is substantially even with to said tops of said shoulders.

20. The integrated-magnetic assembly for the power converter of claim 19, wherein each of said shoulders have at least one end that is laterally separated from each other so as to form at least one opening along the circumference of said first base; and wherein said generally flat means comprises at least one generally circular electrical insulator that has a diameter less than said diameter of said first base and that has a wing that is located along the circumference of said electrical insulator, that fits within said opening between said ends of said shoulders and that extends at least to said circumference of said first base.

21. The integrated-magnetic assembly for the power converter of claim 20, wherein said wing has one end that is located next to one end of one of said shoulders and has an opposite end that is located adjacent to one end of the other of said shoulders; and wherein said one electrical conductor has an end that is located next to said one end of said wing; and wherein said additional electrical conductor has an end that is located next to said opposite end of said wing.

22. The integrated-magnetic assembly for the power converter of claim 19, wherein said core form further comprises: a second generally circular base having two opposite substantially flat sides, having a circumference and a diameter generally equal to that of said first base, and having a thickness that is generally equal to said thickness of said first base; two opposite relatively thin arcuate shoulders that are located on at least one of said sides of said second base and closely adjacent to said circumference of said second base, said shoulders having substantially flat tops and together with said shoulders of said first base forming at least part of said interior cavity; and a circular post that is located on said at least one side of said second base and between said shoulders on said second base, said post having a top that is substantially even with to said tops of said shoulders on said second base, said top of said post of said second base abutting said top of said post of said first base so as to form said un-gapped core column.

23. The integrated-magnetic assembly for the power converter of claim 19, wherein said core-element comprises: a second generally circular base having two opposite substantially flat sides, having a circumference and a diameter generally equal to that of said first base, and having a thickness that is generally equal to said thickness of said first base; two opposite relatively thin arcuate shoulders that are located on at least one of said sides of said second base and closely adjacent to said circumference of said second base, said shoulders having substantially flat tops and together with said first base forming at least part of said interior annulus; and a circular post that is located on said at least one side of said second base and between said shoulders on said second base, said post having a top that is below said tops of said shoulders on said second base, said tops of said shoulders on said second base abutting said first base, said post of said second base and said first base comprising said un-gapped core column.

24. The integrated-magnetic assembly for the power converter of claim 19, wherein said core-element comprises: a second generally circular base having two opposite substantially flat sides, having a circumference and a diameter generally equal to that of said first base, and having a thickness that is generally equal to said thickness of said first base; two opposite relatively thin arcuate shoulders that are located on one of said sides of said second base and closely adjacent to said circumference of said second base, said shoulders having substantially flat tops and together with said first base forming at least part of said interior annulus; a circular post that is located on said one side of said second base and between said shoulders on said second base, said post having a top that is at the same elevation as said tops of said shoulders on said second base; and a flat thin insulator that is sandwiched between said top of said post of said second base and said first base to form said un-gapped core column, said tops of said shoulders on said second base abutting said first base.

25. The integrated-magnetic assembly for the power converter of claim 19, wherein said shoulders have a width and said wing extends for a distance approximately equal to said width of said shoulders.

26. Integrated-magnetics, comprising:
   a) a first planar core-piece having two opposite sides and having a perimeter;
   b) a second planar core-piece having two opposite sides and having a perimeter;
   c) an un-gapped core piece carried between one of said sides of said first planar core-piece and said second planar core-piece;
   d) flux-path means, located for the most part adjacent to said perimeter of said first planar core-piece and said second planar core-piece and carried by at least one of said first planar core-piece and said second planar core-piece, for forming a flux path between said first planar core-piece and said second planar core-piece;
   e) first printed circuit board means, located adjacent to said first planar core-piece and having an aperture that fits around said un-gapped core element, for carrying at least one flat electrical winding around said aperture;
   f) second printed circuit board means, located adjacent to and spaced apart from said second planar core-piece and having an aperture that fits around said un-gapped core element, for carrying at least one additional flat electrical winding around said aperture, said at least one flat electrical winding and said at least one additional flat electrical winding being located substantially within said cavity and, in response to the flow of electrical current therethrough and the magnetic flux thereformed, being transformingly coupled together through said un-gapped core element and said flux-path means;
   g) a third planar core-piece having a perimeter and having a side that is located adjacent to one of said sides of said first planar core-piece;
   h) means, carried by said third planar core-piece, for forming a gapped core element between said first planar core-piece and said third planar core-piece;
   i) means, carried by said third planar core-piece, for forming a flux path between said perimeter of said third planar core-piece and said perimeter of said first planar core-piece; and
   j) third printed circuit board means, located between said first planar core-piece and said third planar core-piece and having an opening that fits around said gapped core element, for carrying at least one flat electrical winding that in response to the flow of electrical current therethrough and the magnetic flux thereformed and passing through said gapped core element is inductively coupled to said at least one flat electrical winding and said at least one additional flat electrical winding and that is phased relative to said one flat electrical winding and said one additional flat electrical winding to have said magnetic flux passing through said gapped core element substantially in the same direction as said magnetic flux passing through said un-gapped core element.

27. The integrated-magnetics of claim 26, wherein said magnetic flux passing through said gapped core element comprises a DC and an AC component; and wherein said magnetic flux passing through said un-gapped core element comprises substantially an AC component that has a magnitude that is on the order of the magnitude of said gapped core element.

28. The integrated-magnetics of claim 27, further including means, located between said first printed circuit board means and said second printed circuit board means, for electrically insulating said at least one electrical winding from said at least one additional electrical winding.

29. An integrated-magnetic apparatus, comprising:
   generally flat electrical insulating means, having an aperture therein, for insulatingly carrying at least two generally flat, laterally offset and spaced apart electrical windings of a power converter around said aperture located within said flat electrical insulating means;
   a core having an interior cavity, having at least one generally flat exterior surface and having an un-gapped core-column that is located within said cavity and that passes through said aperture of said insulating means, said at least two electrical windings being substantially located within said cavity and being adapted to be transformingly coupled together through said core;
   flat-sided means, carried by said at least one generally flat exterior surface of said core, for forming an interior annulus that is located adjacent to said at least one flat exterior surface of said core and for forming a core-column that has a gap and that is located within said annulus; and
   printed circuit board means, carried by said flat-sided means and around said gapped core-column, for carrying at least one electrical winding of said power converter, said at least one electrical winding being substantially located within said annulus, being adapted to be inductively coupled through said gapped core-column to said two generally flat and laterally offset electrical windings in response to current flowing therethrough and the magnetic flux thereformed.

30. The integrated-magnetic apparatus of claim 29, further including another flat-sided means, carried by another flat face of said core, for forming interior chamber and carrying therein at least one printed circuit board having at least one electrical winding for said power converter.

* * * * *